(12) United States Patent
Corre et al.

(10) Patent No.: US 10,101,497 B2
(45) Date of Patent: Oct. 16, 2018

(54) METHOD FOR DETERMINING A KARSTIC REGION

(71) Applicant: TOTAL SA, Courbevoie (FR)

(72) Inventors: Bernard Corre, Pau (FR); Patrick Henriquel, Pau (FR); Philippe Lapointe, Pau (FR); Richard Labourdette, Pau (FR); Pierre Biver, Pau (FR)

(73) Assignee: TOTAL SA, Courbevoie (FR)

( * ) Notice: Subject to any disclaimer, the term of this patent is extended or adjusted under 35 U.S.C. 154(b) by 505 days.

(21) Appl. No.: 14/433,532

(22) PCT Filed: Sep. 27, 2013

(86) PCT No.: PCT/EP2013/070291
§ 371 (c)(1),
(2) Date: Apr. 3, 2015

(87) PCT Pub. No.: WO2014/053423
PCT Pub. Date: Apr. 10, 2014

(65) Prior Publication Data
US 2015/0253461 A1    Sep. 10, 2015

Related U.S. Application Data

(60) Provisional application No. 61/710,371, filed on Oct. 5, 2012.

(51) Int. Cl.
*G06G 7/48* (2006.01)
*G01V 99/00* (2009.01)
*G06F 17/10* (2006.01)

(52) U.S. Cl.
CPC .......... *G01V 99/005* (2013.01); *G06F 17/10* (2013.01)

(58) Field of Classification Search
CPC .................................................. G01V 99/005
USPC ............................................................ 703/10
See application file for complete search history.

(56) References Cited

FOREIGN PATENT DOCUMENTS

WO    WO 2012/045937 A2    4/2012
WO    WO 2012/072923 A2    6/2012

OTHER PUBLICATIONS

English translation of WO 2012045937; 8 pp; Apr. 12, 2012.*
(Continued)

*Primary Examiner* — Hugh Jones
(74) *Attorney, Agent, or Firm* — Patterson Thuente Pedersen, P.A.

(57) ABSTRACT

The present invention relates to a method for determining a karstic region modified by karstification phenomena. This method comprises, from a geological model, determining a seed cell and a target cell in that model. If a distance between the seed cell and the target cell is above a given distance, it is possible to update the seed cell with a bifurcation cell based at least on the coordinates of the seed cell, the coordinates of the target cell, a distance distribution, an angular distribution, and to re-iterate the test. Based on that bifurcation cells, trajectory is computed and cells of that trajectory is updated with new cell characteristics.

19 Claims, 8 Drawing Sheets

(56) References Cited

OTHER PUBLICATIONS

PCT International Search Report for International Application No. PCT/EP2013/070291, dated May 26, 2014, 4 pgs.
PCT Written Opinion for International Application No. PCT/EP2013/070291, dated May 26, 2014, 6 Pgs.
O. Joquet et al., "Stochastic discrete model of karstic networks", *Advances in Water Resources*, vol. 27, No. 7, (2004) pp. 751-760.

* cited by examiner

METHOD FOR DETERMINING A KARSTIC REGION

RELATED APPLICATIONS

The present application is a National Phase entry of PCT Application No. PCT/EP2013/070291, filed Sep. 27, 2013, which claims priority from U.S. Patent Application No. 61/710,371, filed Oct. 5, 2012, said applications being hereby incorporated by reference herein in their entirety.

BACKGROUND OF THE INVENTION

The invention relates to the field of the simulation of geological processes for studying the subsoil. Interest is particularly focused on the karstification phenomena in a karstic region.

The approaches described in this section could be pursued, but are not necessarily approaches that have been previously conceived or pursued. Therefore, unless otherwise indicated herein, the approaches described in this section are not prior art to the claims in this application and are not admitted to be prior art by inclusion in this section. Furthermore, all embodiments are not necessarily intended to solve all or even any of the problems brought forward in this section.

Karstification of a rock is the phenomenon whereby this rock is fashioned by the dissolution of carbonates in water. The water infiltrates through interstices of the rock, for example pores or fractures, and this infiltration increases the size of these interstices by virtue of the dissolution of carbonates of the rock in the infiltrated water. Conduits and cavities can thus be formed.

The water may typically be rainwater made acid by carbon dioxide from the atmosphere or the ground. The water may, among other things, originate for example from hydrothermal lifts.

The rock may, for example, comprise limestone.

In carbonate reservoirs, karst processes are frequently observed. These processes have a clear impact on reservoir flow performances and predictions: some distant wells could be connecting extremely fast while other close wells could be not effectively connected. For this reason, to get a precise picture of the potentiality of a reservoir, it is important to address simultaneously two different objectives:
  the appropriate representation of karst conduits network which controls the connectivity of the reservoir;
  the formalization of a framework to address uncertainties on global connected volumes and related local heterogeneities location.

It is known practice to model a karstic region statically, by using observations, in particular geological and seismic observations. When drilling a well, data measured via the well, called well data, can be used to make a posteriori adjustments to the model of the karstic region.

The article by O. Jaquet et al, "Stochastic discrete model of karstic networks", Advances in Water Resources 27 (2004), 751-760, describes a method for simulating karstification phenomena based on a stochastic approach. In this work, a karstic region is modeled as a network of pipes with permeabilities and porosities depending on particles traveling through these pipes. These particles are corresponding to water droplets introduced in karstic system, and their displacement over the network is subjected to laws of "random walk" type. This method could be named as a pseudo-genetic approach.

There is a need to improve the efficiency of the determination, to provide fast and efficient geometrical techniques to distribute conduits zones consistently with paleo-aquifers infiltration and outlet regions, with reasonable CPU performance.

SUMMARY OF THE INVENTION

The invention relates to a method for determining a karstic region modified by karstification phenomena. The method comprises:
  a/ receiving a geological model of the karstic region comprising cells, said model comprising at least one seed zone comprising cells of the model and at least one target zone comprising cells of the model, each cells of the model having coordinates;
  b/ determining a seed cell in the cells of the at least one seed zone;
  c/ determining a target cell in the cells of the at least one target zone;
  d/ if a distance between the seed cell and the target cell is above a predetermined distance:
    d1/ determining a bifurcation zone based at least on the coordinates of the seed cell, the coordinates of the target cell, a distance distribution, an angular distribution,
    d2/ determining a bifurcation cell in said bifurcation zone;
    d3/ re-iterating step d/ with a cell based on said bifurcation cell as the seed cell;
  e/ determining trajectory cells in the geological model based on the seed cell, the target cell and bifurcation cells determined in step d/;
  f/ for each current cells in the trajectory cells,
    f1/ determining conduits characteristics based on a predetermined conduit density distribution, a predetermined conduit aperture distribution and trajectory cells connected to said current cell;
    f2/ determining cell characteristics based on the conduits characteristics of said current cell.

The geological model may be for instance a gridded representation of a real soil. In a three dimensions, the geological model may be represented by a matrix, each cell of the matrix having three indexes (i,j,k). Each cell of the matrix comprises information regarding geological and/or geophysical characteristics in the cell such as porosity, permeability in all space directions, etc.

The cell characteristics may comprise, for instance a single set of porosity and permeability values. These values may correspond to the equivalent porosity $\phi_{equ}$ and permeability $K_{equ}$ of the matrix (i.e. the content of the cell) with the conduits inside this matrix.

The cell characteristics may also comprise a plurality of sets of porosity and permeability values. For instance, one set of this plurality may comprise the porosity $\phi_m$ and permeability $K_m$ values for the matrix without any conduits and another set of this plurality may comprise the porosity $\phi_k$ and permeability $K_k$ values for the conduits inside the matrix only. It is also possible to determine a "exchange coefficient" between these two components. The exchange coefficient σ may be chosen by an operator. In one possible embodiment, the exchange coefficient σ may be $$2\pi \frac{n_c}{S} \frac{(R_d^2-1)^2}{R_d^4(\ln(R_d)-0.75)+R_d^2-0.25} \text{ where } R_d = \frac{1}{2\bar{r}_i\sqrt{\frac{n_c}{S}}} \text{ and } \frac{n_c}{S}$$

being the density of conduits in the cells in m² and $\overline{r_i}$ being the mean of the radius of the conduits in the cells ($\overline{r_i}=r_i$ if the radius of all conduits are identical and equal to $r_i$).

With the above method, karstification simulation may be easily determined with a geometrical process. This process is simple to iterate and thus is only reasonable CPU performance is needed.

The angular distribution may be limited to one unique angle (e.g the probability for the angle 0° is 1 while the probability of the other angles is 0).

The angular distribution may be limited to a uniform cone (e.g the probability of angles in the cone $[-\alpha;+\alpha]$ is uniform while the probability of angles outside the cone is 0).

The distance distribution may be limited to a unique distance (e.g the probability for the distance $d_1$ is 1 while the probability of the other distances is 0).

The distance distribution may be limited to a uniform interval (e.g the probability of distances in the interval $[d_1;d_2]$ is uniform while the probability of distances outside the interval is 0).

In one embodiment, steps b/ to f/ may be re-iterated a plurality of times with same seed zone and target zone.

In consequence, it is possible to determine a plurality of "karst trajectories" and, due to a stochastic approach, to create a broad zone in the model where a karstification phenomenon has eroded the subsoil.

In addition, said model comprising a plurality of seed zones and a plurality of target zones, steps b/ to f/ may be re-iterated a plurality of times with different combination of seed zone in the plurality of seed zones and target zone in the plurality of target zones.

Thus, it is possible to take in account the fact that there is a plurality of outlet or infiltration zone. In addition, a seed zone in a first determination may be a target zone for a second determination.

According to another embodiment, the seed cell may be determined in step b/ according a stochastic process and according a predetermined distribution in the at least one seed zone. The distribution may be uniform in the at least one seed zone.

Moreover, the target cell may be determined in step c/ according a stochastic process and according a predetermined distribution in the at least one target zone. This distribution may also be uniform in the at least one target zone.

In one embodiment, the cell based on said bifurcation cell may be said bifurcation cell. In consequence, the reiteration of step d/ is easy as the bifurcation cell is used as the seed cell in the reiteration.

In addition, the cell based on said bifurcation cell is a cell corresponding to a projection of the bifurcation cell on a line defined by the seed cell and the target cell.

The projection may be an orthogonal projection for instance. The projection may also be a determination of a cell on the line defined by the seed cell and the target cell where the distance between this cell and the seed cell and the distance between the bifurcation cell and the target cell is the same. The projection may also be a determination of a cell on the line defined by the seed cell and the target cell where the distance between this cell and the target cell and the distance between the bifurcation cell and the target cell is the same.

Determining trajectory cells may also be performed by:
  ordering the bifurcation cells according to an order of determination in step d/ in a list of cells;
  adding the seed cell at a first position in said list of cells;
  adding the target cell at a last position in said list of cells;
  determining segments in the model between two consecutive cells in the list of cells;
  determining cells of the model based on an approximation line algorithm.

This "ordering" allows to determine which cells has been determined before others, for instance, thanks to an index associated with said cells.

After the three first sub-steps, the list of cells comprises a plurality of cells where the first cell is the seed cell, the last cell is the target cell and the other cells of the list is ordered according to their order of determination.

Hence, the approximation line algorithm may be one algorithm in a group comprising the Bresenham algorithm, the DDA algorithm, and the Run-Slice computational algorithm.

Then, the approximation enables a discretization of the trajectory.

In one embodiment, determining trajectory cells may be performed by:
  ordering the bifurcation cells according to an order of determination in step d/ in a list of cells;
  adding the seed cell at a first position in said list of cells;
  adding the target cell at a last position in said list of cells;
  determining an interpolation curve fitting the list of cells in the model;
  determining cells of the model based on an approximation curve algorithm.

In another embodiment, determining conduits characteristics may comprise:
  the cell being a 2D cell, for each direction of space perpendicular to at least one edge of the current cell, if an edge of said current cell perpendicular to said direction is shared with a trajectory cell connected to said current cell, determining at least one conduit in said current cell in said direction, a radius $r_c$ of said conduit is determined in said predetermined conduit aperture distribution, or
  the cell being a 3D cell, for each direction of space perpendicular to at least one side of the current cell, if a side of said current cell perpendicular to said direction is shared with a trajectory cell connected to said current cell, determining at least one conduit in said current cell in said direction, a radius $r_c$ of said conduit is determined in said predetermined conduit aperture distribution.

A cell is connected with another cell if it shares at least one edge (in 2D) or a side (in 3D). When the model is a grid with 3D cubic cells, most of the cells of the model are connected with six other cells. When the model is a grid with 2D square cells, most of the cells of the model are connected with four other cells.

Thus, the radius of conduits in a given cell may be easily determined in the trajectory direction.

The conduit aperture distribution may be a uniform distribution between a maximum and a minimum radius or, for instance, a Gaussian distribution centred on a central radius.

Moreover, determining conduits characteristics may comprise:
  the cell being a 2D cell, for each direction of space perpendicular to at least one edge of the current cell, if a edge of said current cell perpendicular to said direction is shared with a trajectory cell connected to said current cell,
  determining a number $N_c$ of conduits to be determined based on said predetermined conduit density distribution;

determining $N_c$ conduits in said current cell in said direction; or the cell being a 3D cell, for each direction of space perpendicular to at least one side of the current cell, if a side of said current cell perpendicular to said direction is shared with a trajectory cell connected to said current cell, determining a number $N_c$ of conduits to be determined based on said predetermined conduit density distribution;

determining $N_c$ conduits in said current cell in said direction.

Thus, the number of conduits in a given cell may be easily determined in the trajectory direction.

The conduit density distribution may be a uniform distribution between a maximum and a minimum density or, for instance, a Gaussian distribution centred on a central density or any user defined distribution.

Once the density is known (based on a random draw in the density distribution), it is possible to determine the number of conduit as the section (side or edge) perpendicular to said direction may be easily determined.

Determining cell characteristics may also comprise:
receiving initial porosity characteristic $\phi_m$ of the current cell;
setting the equivalent porosity $\phi_{eq}$ to $\phi_m$;
for at least one current conduit in the current cell in said direction,
computing a porosity $\phi_{temp}$ of the current cell based on $$\phi_{eq}\left(1 - \frac{S_c}{S}\right) + \frac{S_c}{S}$$

where $S_c$ being a section of the current conduit and S being a section of said edge or side of said current cell perpendicular to said direction and shared with a trajectory cell;
setting the equivalent porosity $\phi$ to $\phi_{temp}$;
For instance, $\phi_{temp}$ may be equal to $$\phi_{eq}\left(1 - \frac{S_c}{S}\right) + \frac{S_c}{S} \text{ or to } \phi_{eq}\left(1 - \frac{S_c}{S}\right) + \frac{S_c}{S} + \phi_{diff}$$

where $\phi_{diff}$ if a diffusive porosity created around the conduit. The section of the current conduit is a length or surface (e.g. $\pi \cdot r_c^2$ if the conduit is a 3D circular tube, $r_c$ if the conduit is a 2D rectangle). The section of an edge or a side of said current cell is a length or surface.

In one embodiment, determining cell characteristics may further comprise:
receiving initial permeability characteristic $K_m$ of the current cell;
setting the equivalent permeability $K_{eq}$ to $K_m$;
for at least one current conduit in the current cell in said direction,
computing the permeability $K_{temp}$ of the current cell based on $$K_{eq}\left(1 - \frac{S_c}{S}\right) + K_c\frac{S_c}{S}$$

where $S_c$ being a section of the current conduit, S being a section of said edge or side of said current cell perpendicular to said direction and shared with a trajectory cell and where $K_c$ is the permeability of the current conduit;
setting the equivalent permeability $K_{eq}$ to $K_{temp}$.

$K_c$ may be determined according a Poiseuille law for flow in tubes.

Permeability of the current conduit may be, for instance, computed based on $$\frac{N_c}{S} \cdot \frac{\pi r_c^4}{8} 10^{15}$$

where $S_c$, $N_c$ and $r_c$ is defined above.

A second aspect relates to a computer program product comprising a computer readable medium, having thereon a computer program comprising program instructions. The computer program is loadable into a data-processing unit and adapted to cause the data-processing unit to carry out the method described above when the computer program is run by the data-processing unit.

Other features and advantages of the method and apparatus disclosed herein will become apparent from the following description of non-limiting embodiments, with reference to the appended drawings.

BRIEF DESCRIPTION OF THE DRAWINGS

The present invention is illustrated by way of example, and not by way of limitation, in the figures of the accompanying drawings, in which like reference numerals refer to similar elements and in which.

DETAILED DESCRIPTION OF THE DRAWINGS

Figure 1A:
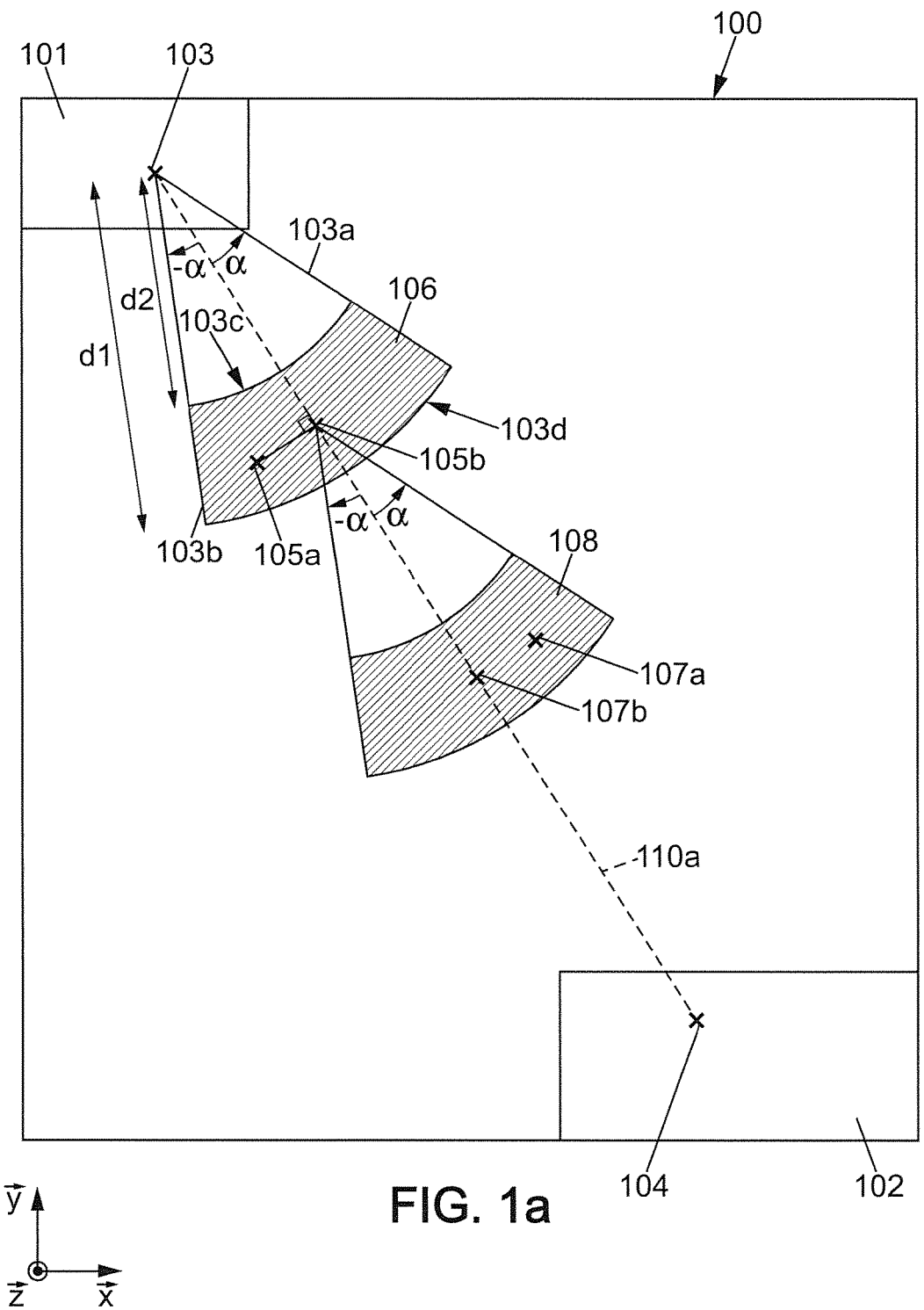
FIGS. 1a and 1b are possible embodiments to determine bifurcation cells in a received model.
Figure 1B:
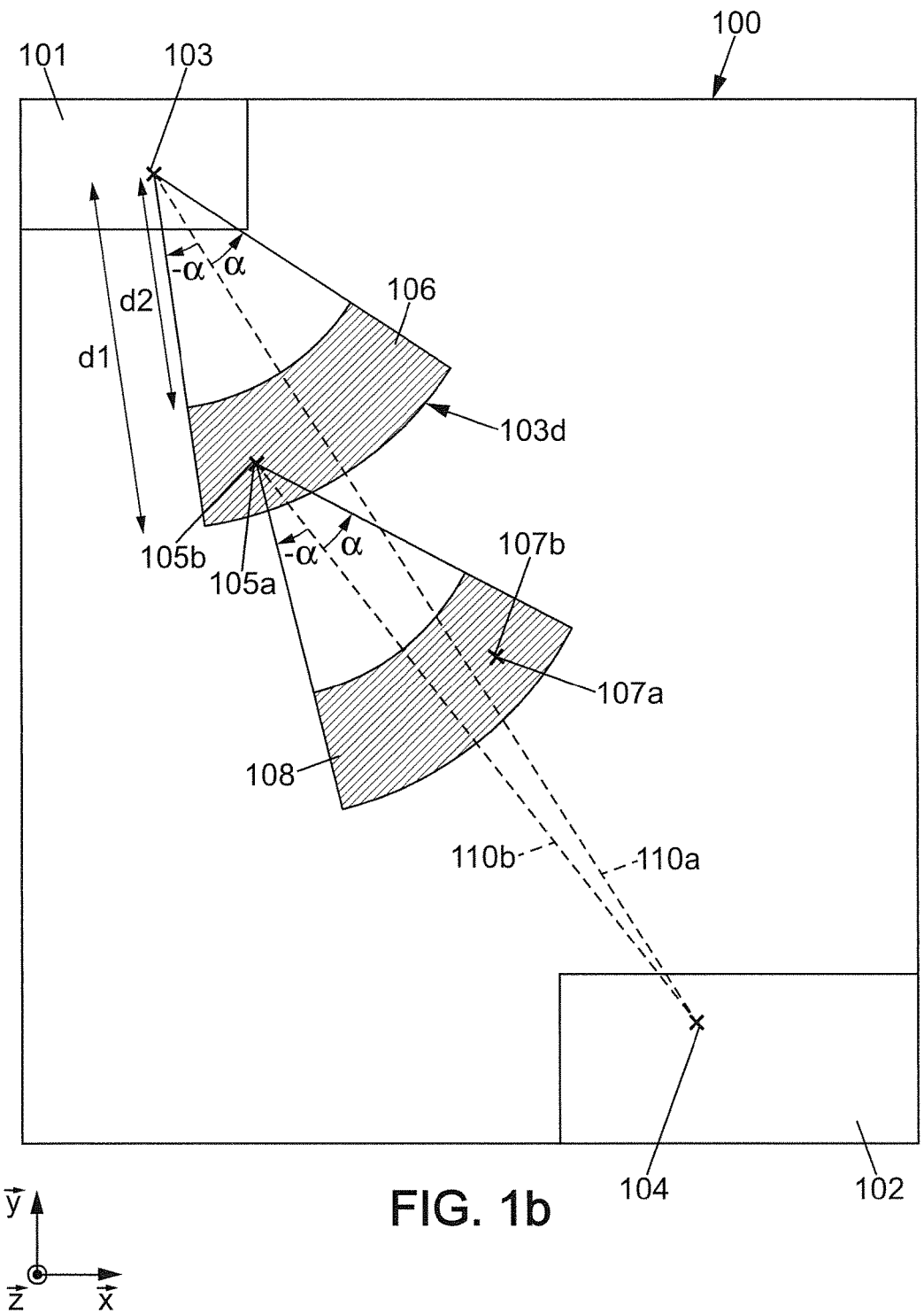

FIGS. 1a and 1b are possible embodiments to determine bifurcation cells in a received model.

In a received model 100, a group of cells may be designated as the seed zone 101. These cells may be identified by geologists or reservoir engineers according to their knowledge of the real subsoil. For instance, cells corresponding to the following conditions may be designated in the seed zone:
when associated to an epikarst;
when associated to an infiltration zone in the subsoil;
when associated to known fractures;
etc.

The cells of the seed zone may be associated with a probability value (e.g. in a distribution).

It is then possible to determine (for instance, according to a stochastic process and/or according to the probability values associated to the cells of the seed zone) a seed cell 103.

In a received model 100, a group of cells may be designated as the target zone 102. These cells may be identified by geologists or reservoir engineers according to their knowledge of the real subsoil. For instance, cells corresponding to the following conditions may be designated in the target zone:
when associated to an outlet;
when associated to a low level;
etc.

The cells of the target zone may be associated with a probability value (e.g. in a distribution).

It is then possible to determine (for instance, according to a stochastic process and/or according to the probability values associated to the cells of the target zone) a target cell 104.

From this seed cell 103 and from this target cell 104, it is possible to compute a bifurcation zone based on a received distance distribution, and on a received angular distribution.

The angular distribution may be defined by a geologist or a reservoir engineer and stored in a database. This angular distribution may provide a maximal angular deviation (for instance, a in the FIG. 1a or 1b) and a minimal angular deviation (for instance, $-\alpha$ in the FIG. 1a or 1b). This maximal deviation is represented by line 103a defined so that the angle between line 110a and 103a is $\alpha$. This minimal deviation is represented by line 103b defined so that the angle between line 110a and 103b is $-\alpha$. Between the maximal deviation and the minimal deviation, the angular distribution may be uniform or non-uniform (e.g. Gaussian, etc.) and equals to 0 outside the cone defined by the maximal deviation and the minimal deviation.

The distance distribution may be defined by a geologist or a reservoir engineer and stored in a database. This distance distribution may provide a maximal distance (for instance, $d_1$ in the FIG. 1a or 1b) and a minimal distance (for instance, $d_2$ in the FIG. 1a or 1b). Between the maximal distance and the minimal distance, the distance distribution may be uniform or non-uniform (e.g. Gaussian, etc.) and equals to 0 outside the interval defined by the maximal distance and the minimal distance.

The combination of the angular distribution and the distance distribution defines a hatched zone 106 named "bifurcation zone".

It is then possible to determine (for instance, according to a stochastic process and/or according to the angular/distance distribution) a bifurcation cell 105a.

As illustrated in FIG. 1a, it is possible to reiterate the above described process by computing an orthogonal projection 105b of the cell 105a on the line 110a and by using this new cell corresponding to the projection 105b as the seed cell. Other projections are also possible.

As illustrated in FIG. 1b, it is possible to reiterate the above described process by using the bifurcation cell 105a as the seed cell. Therefore, the line 110a is transformed into line 110b.

The process of determination of bifurcation cells is ended when the distance between the newly determined bifurcation cell and the target cell is less than a predetermined distance (for instance $d_2$, i.e. the maximal distance).

Figure 1C:
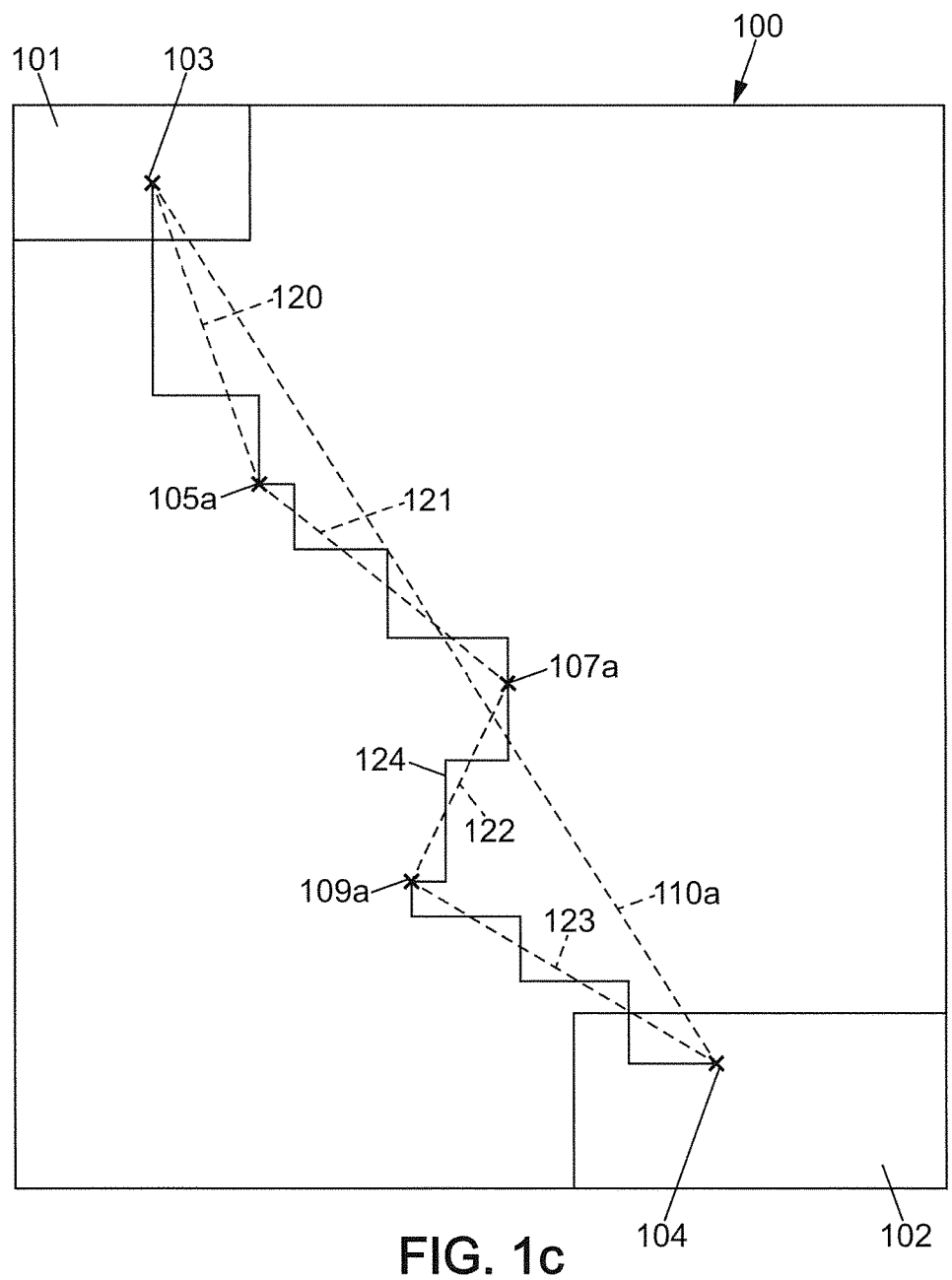
FIGS. 1c and 1d are possible embodiments to determine trajectory cells in a received model according to the determined bifurcation cell s.
Figure 1D:
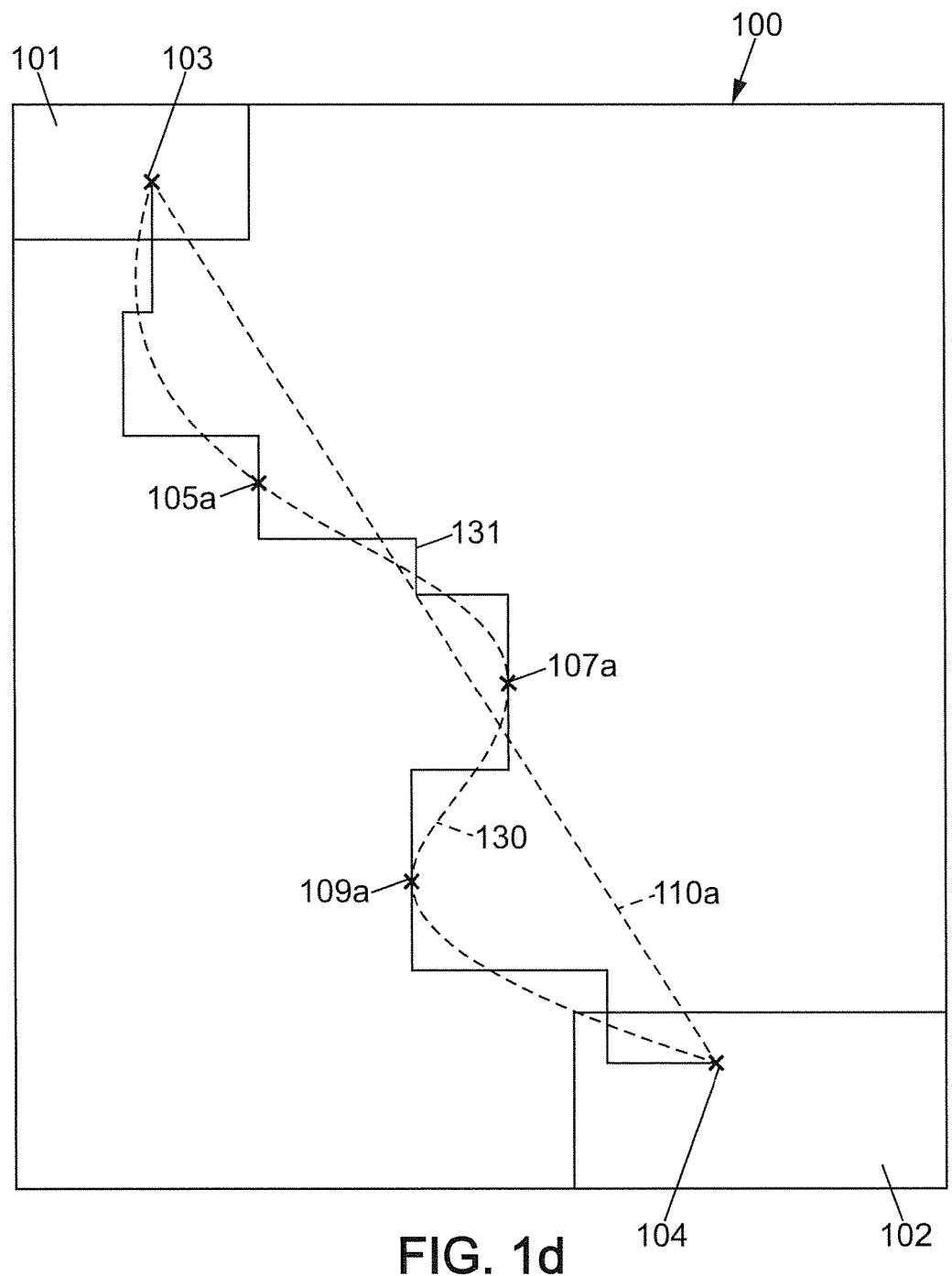

FIGS. 1c and 1d are possible embodiments to determine trajectory cells in a received model according to the determined bifurcation cells.

Once the bifurcation cells are determined as detailed in FIG. 1a or 1b (for instance), it is possible to determine trajectory cells.

For instance, in FIG. 1c, segments are determined between two consecutive cells:

segment 120 between seed cell 103 and bifurcation cell 105a;
segment 121 between bifurcation cell 105a and bifurcation cell 107a;
segment 122 between bifurcation cell 107a and bifurcation cell 109a;
segment 123 between bifurcation cell 109a and target cell 104.

Once, these segments are determined, it is possible to determine the cells of the model which fit the best the segments: they will be named "trajectory cells". Many possible method are possible to such determination: the Bresenham's line algorithm (or "Bresenham algorithm"), the DDA algorithm (or "Digital differential analyzer"), and the "Run-Slice computational algorithm" are possible for instance. It is a discretization process In consequence, these trajectory cells describe a stair step trajectory 124 which is an estimation of the segments 120 to 123 according to the grid cells resolution.

It is also possible to determine a curve that fits the bifurcation cells as described in FIG. 1d. This determination may use a linear regression, polynomial regression or other regressions that determine a curve 130 that fits to the determined cells. Then, a discretization of the curve 130 is performed to obtain the stair step trajectory 131. This discretization may be computed by first approximating the curve with a plurality of determined length segments and then applying the previous algorithm on those segments. Other discretization processes are possible.

Figure 2A:
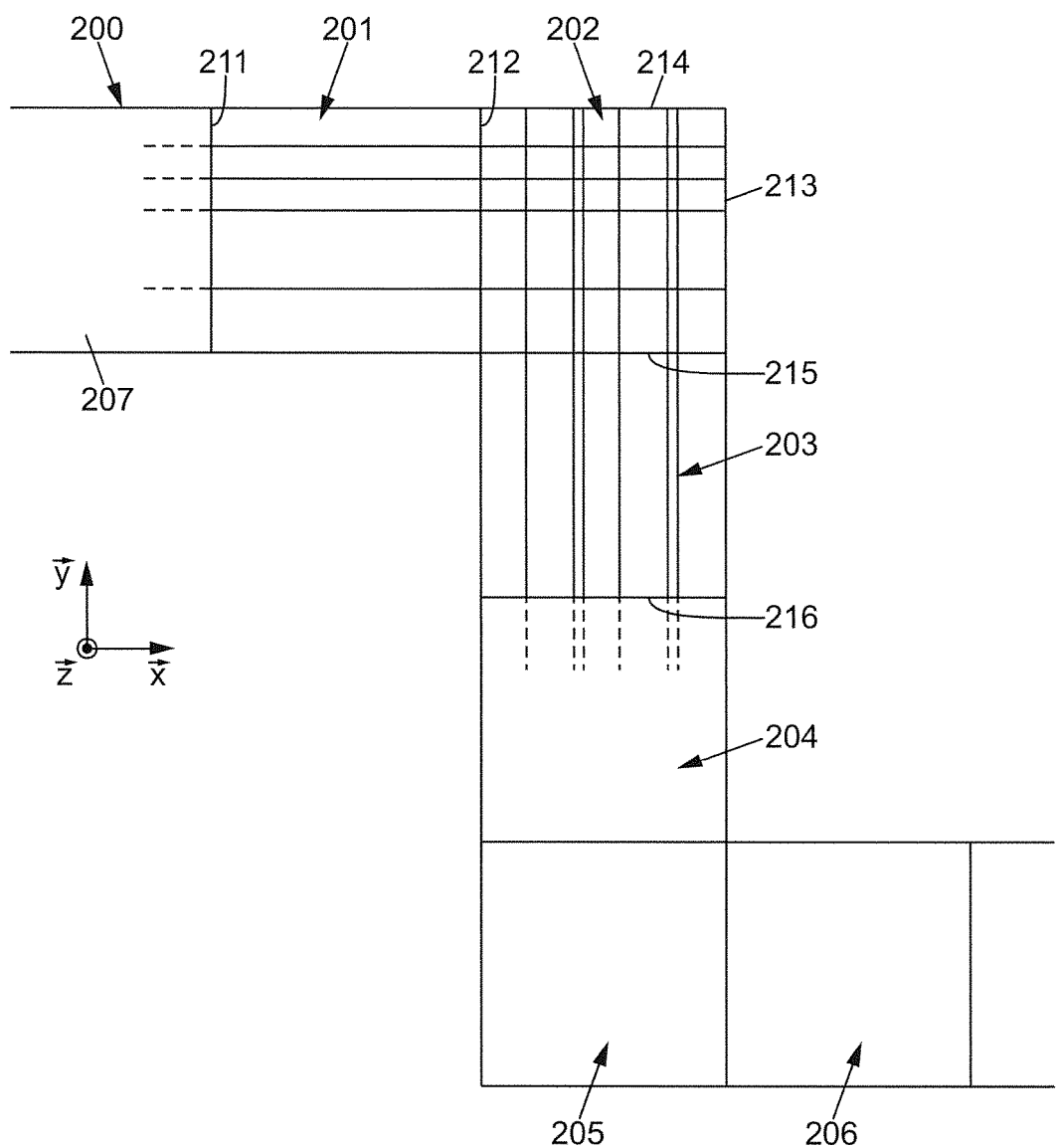
FIG. 2a is a representation of conduits in trajectory cells.

FIG. 2a is a representation of conduits in trajectory cells.
Examples of trajectory cells 200 in FIG. 2a are represented by cells 201, 202, 203, 204, 205, 206 and 207.

For each current cell of the trajectory cells (or of a subset of these trajectory cells), conduits are determined in the current cell.

Indeed, the karst modeling procedure is often developed on grid cells of the reservoir which have typical dimensions of 50 to 200 meters horizontally and 1 to 10 meters vertically. As a consequence, the trajectory cells are often not to be considered as a unique conduit with 100% of voids because the void is not so huge in the real subsoil.

Conduits are oriented according to the stair step trajectory and is perpendicular to one of the grid cell side (for instance in the $\vec{x}$ or $\vec{y}$ direction for horizontal conduits, in the $\vec{z}$ direction for vertical conduits and for 3D cells) or of the grid cell edge (for instance in the $\vec{x}$ or $\vec{y}$ direction for 2D cells). For instance, conduits in cell 201 are oriented along the $\vec{x}$ axis as the stair step trajectory is horizontal (i.e. along $\vec{x}$) for this cell: the previous cell 207 in the trajectory and the following cell 202 in the trajectory are on the same line than the current cell 201. Conduits in cell 203 are oriented along the $\vec{y}$ axis as the stair step trajectory is vertical (i.e. along $\vec{y}$) for this cell: the previous cell 202 in the trajectory and the following cell 204 in the trajectory are on the same column than the current cell 203. For a "corner" cell, i.e. a cell where the trajectory changes its direction from a first direction (i.e. $\vec{x}$) to a second direction (i.e. $\vec{y}$), conduits are oriented according to the first and second directions. Then, in cell 202, conduits are oriented according to both $\vec{x}$ and $\vec{y}$ directions.

To determine the characteristics of the conduits (e.g. their number), it is possible to indicate conduits density (i.e. the number of conduits per unit of section perpendicular to conduits direction) inside the cell. This density may be a simple number, a distribution or an interval (i.e. a uniform distribution). If a distribution or an interval is indicated, a random draw may be performed for each cell of the trajectory cells in order to determine a number $$\frac{N_c}{S}.$$

Figure 2B:
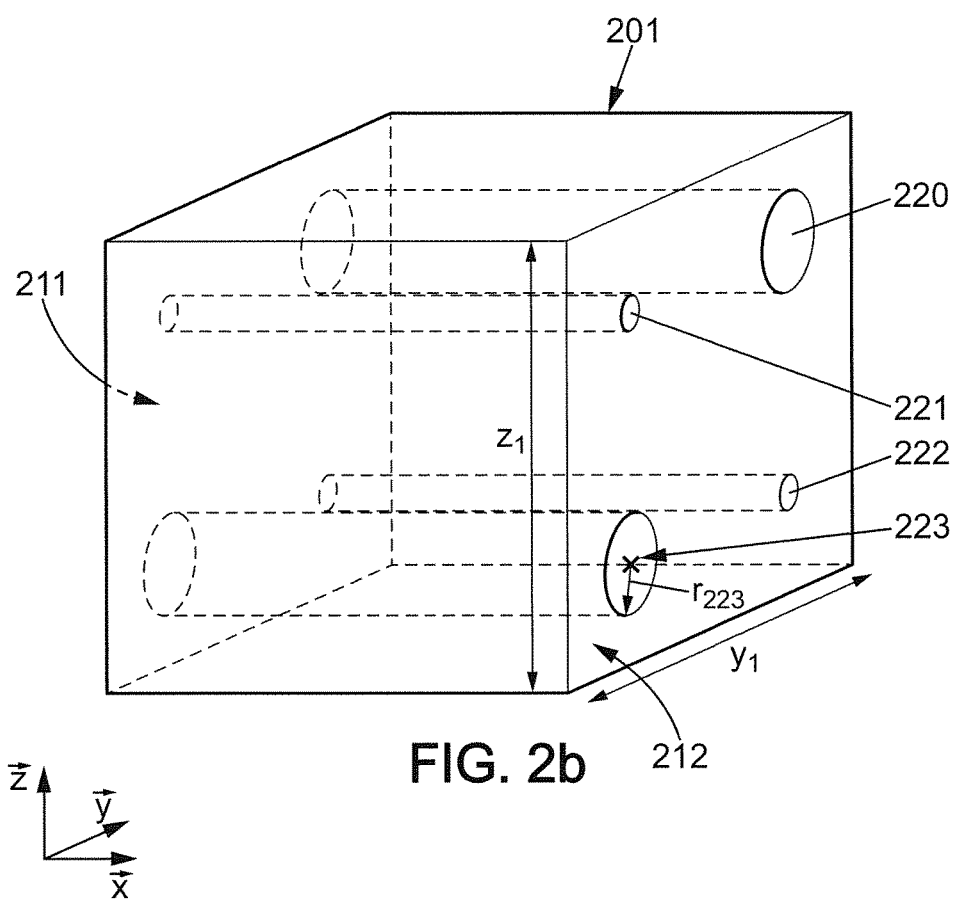
FIG. 2b is a representation of conduits in a current trajectory cell.

Referring to FIG. 2b, the section $S=z_1y_1$ thus it is possible to determine the number of conduit in a cell along a direction as S and $$\frac{N_c}{S}$$

are known. In the present case, four conduits (220, 221, 222, and 223) are determined in cell 201. These conduits are perpendicular to sides 211 and 212.

To determine the characteristics of the conduits (e.g. their dimensions), it is possible to indicate conduits aperture radius $r_c$. If a distribution or an interval is provided, a random draw may be performed for each cell in order to determine a number $r_c$ (see radius $r_{223}$, the radius of conduit 223 in FIG. 2b).

The random draw may be performed for all conduits in the cell (i.e. the same radius is shared for all conduits) or for each conduit in the cell (i.e. teach conduit may have a different radius).

Figure 3:
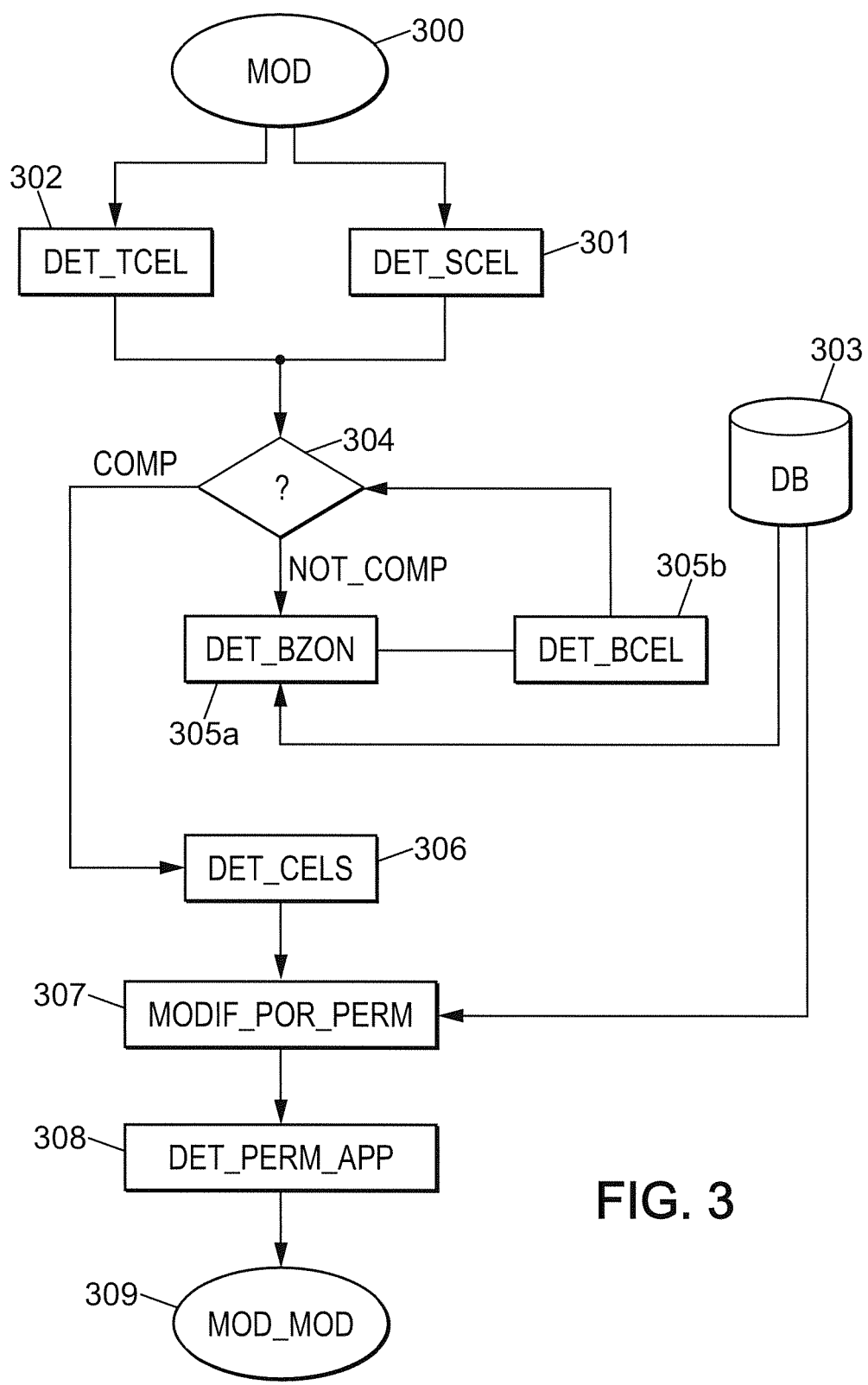
FIG. 3 is a flow chart describing a possible embodiment of the present invention.

FIG. 3 is a flow chart describing a possible embodiment of the present invention. Part of this flow chart can represent steps of an example of a computer program which may be executed by the device of FIG. 4.

Upon the reception of a geological model 300 of a real or estimated karstic region, a seed zone and a target zone is identified in the model. This identification is performed by scanning cells of the model and looking for a special flag. It is also possible to receive in a distinct message the indication of the list of cells that are in said zones. In addition, these zones may comprise a plurality of sub zones, connected or disconnected.

Once the seed zone is known, a seed cell in the seed zone may be determined (step 301). For instance, the seed cell may determine according a stochastic process: a random draw is performed in a first distribution associated with the cells of the seed zone.

Once the target zone is known, a target cell in the target zone may be determined (step 301). For instance, the target cell may determine according a stochastic process: a random draw is performed in a distribution associated with the cells of the target zone.

The first and second distributions may be uniform or non-uniform. These distributions are often determined by geologists or reservoir engineers.

Once the seed cell and the target cell are determined as detailed above, the distance between these two cells is computed.

If this computed distance is above a predetermined distance (test 304, output NOT_COMP), a bifurcation zone (step 305a) and a bifurcation point (step 305b) are determined as detailed in FIG. 1a or FIG. 1b and the description attached. The distance distribution and the angular distribution mentioned may be stored, for instance, in a database 303 or a part of a memory of a computer.

If this distance is below or equal to the predetermined distance (test 304, output COMP), the seed cell, the target cell and the bifurcation may be ordered and trajectory cells may be determined as explained above.

Once the trajectory cells are determined, it is possible to modify (step 307) the permeability characteristic and the porosity characteristic. In order to perform such modifications, conduits may be estimated in the cells according a process described in FIGS. 2a and 2b and the description attached.

It is then possible to determine (step 308) the cell characteristics (e.g. the permeability and the porosity of each cell of the model).

In the following, it is assumed that each cell i of the model have an initial porosity parameter $\phi_{i,init}$ and an initial permeability parameter $K_{i,init}$. If the initial porosity (respectively initial permeability) is not set, it is assumed that $\phi_{i,init}=0$ (respectively $K_{i,init}=0$).

To determine the porosity characteristic (in a given direction) of a given cell i, for each conduit in this cell i in this direction, a new value is set to $$\phi_{i,init}, \text{ i.e. } \phi_{i,init}\left(1-\frac{S_c}{S}\right)+\frac{S_c}{S}$$

where $S_c$ being the section of the current conduit and S being the section of the cell perpendicular to that direction (assuming that the cell is a rectangular parallelepiped, e.g. in FIG. 2b, the direction being $\vec{x}$, the section is $z_1y_1$). This new value may also be $$\phi_{i,init}\left(1-\frac{S_c}{S}\right)+\frac{S_c}{S}+\phi_{diff}$$

where $\phi_{diff}$ is a diffusive porosity created around the conduits.

By iterating this process for all conduits and for all trajectory (if there is a plurality of trajectory), the cells of the model may be updated with new porosity characteristics.

To determine the permeability characteristic (in a given direction) of a given cell i, for each conduit in this cell i in this direction, a new value is set to $$K_{i,init}, \text{ i.e. } K_{i,init}\left(1-\frac{S_c}{S}\right)+K_c\frac{S_c}{S}$$

where $S_c$ being the section of the current conduit (i.e. if the radius is r, the section of the conduit is $\pi \cdot r^2$), S being the section of the cell perpendicular to that direction and where $K_c$ is the permeability of the current conduit. This permeability of the current conduit is computed based on an analogy with Poiseuille law for flow in tubes: in consequence, $$K_c = \frac{N_c}{S} \cdot \frac{\pi r_i^4}{8} 10^{15}$$

with $N_c$ the number of conduits in this direction in the considered cell i and $r_i$ being the radius of the current conduit. Any other analogies or slight variations are possible.

By iterating this process for all conduits and for all trajectory (if there is a plurality of trajectory), the cells of the model may be updated with new permeability characteristics.

Once these characteristics are determined for all cells of the model (or at least for a subset of cells), the new model 309 may be provided:
- to a display device to be displayed, or
- to any other processing device for an additional modification or transformation.

Figure 4:
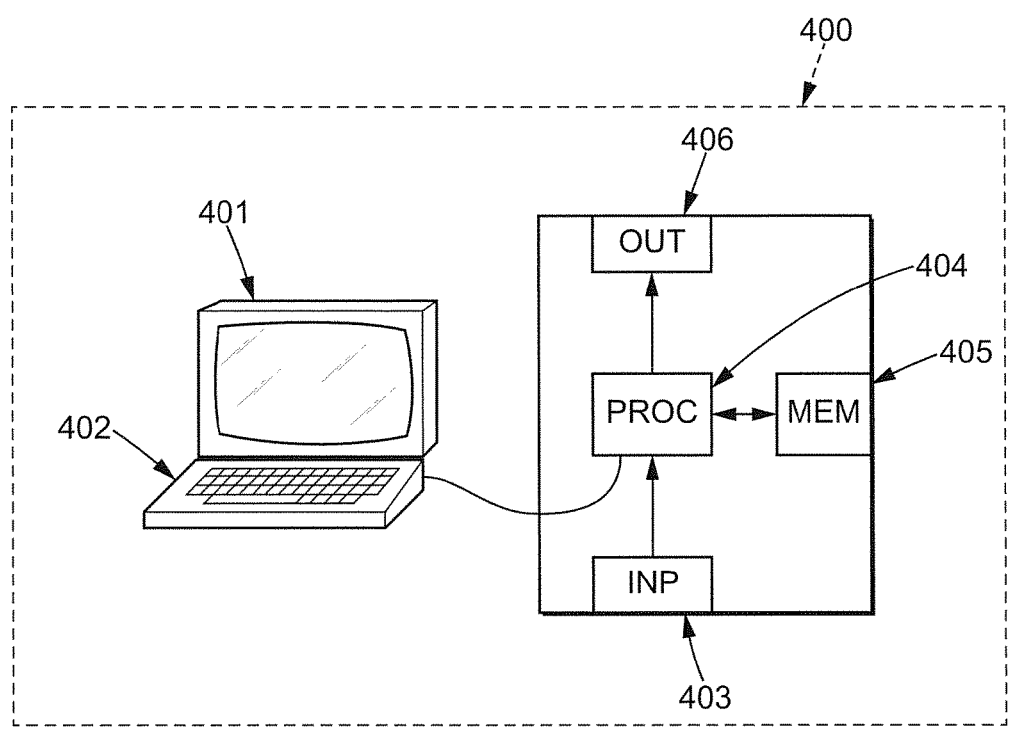
FIG. 4 is a possible embodiment for a device that enables the present invention.

FIG. 4 is a possible embodiment for a device that enables the present invention.

In this embodiment, the device 400 comprise a computer, this computer comprising a memory 405 to store program instructions loadable into a circuit and adapted to cause circuit 404 to carry out the steps of the present invention when the program instructions are run by the circuit 404.

The memory 405 may also store data and useful information for carrying the steps of the present invention as described above.

The circuit 404 may be for instance:
- a processor or a processing unit adapted to interpret instructions in a computer language, the processor or the processing unit may comprise, may be associated with or be attached to a memory comprising the instructions, or
- the association of a processor/processing unit and a memory, the processor or the processing unit adapted to interpret instructions in a computer language, the memory comprising said instructions, or
- an electronic card wherein the steps of the invention are described within silicon, or
- a programmable electronic chip such as a FPGA chip (for <<Field-Programmable Gate Array>>).

This computer comprises an input interface 403 for the reception of the model according to the invention and an output interface 406 for providing parameters of this model (i.e. the porosity for each cell and the permeability for each cell).

To ease the interaction with the computer, a screen 401 and a keyboard 402 may be provided and connected to the computer circuit 404.

Expressions such as "comprise", "include", "incorporate", "contain", "is" and "have" are to be construed in a non-exclusive manner when interpreting the description and its associated claims, namely construed to allow for other items or components which are not explicitly defined also to be present. Reference to the singular is also to be construed in be a reference to the plural and vice versa.

A person skilled in the art will readily appreciate that various parameters disclosed in the description may be modified and that various embodiments disclosed may be combined without departing from the scope of the invention.

For instance, many examples are provided in a two dimensional space but they also apply to a three dimensional space.

The invention claimed is:

1. A method for mapping a karstic region modified by karstification phenomena, comprising:
   a/ creating a geological model of the karstic region comprising cells, the geological model is a gridded matrix of a subsoil area based on a plurality of subsoil measurements, said model comprising at least one seed zone comprising cells of the model, the seed zone including an area of the subsoil having an epikarst, a known fracture or a similar geological phenomenon, and at least one target zone comprising cells of the model, each cells of the model having coordinates;
   b/ determining a seed cell in the cells of the at least one seed zone;
   c/ determining a target cell in the cells of the at least one target zone;
   d/ if a distance between the seed cell and the target cell is above a predetermined distance:
      d1/ determining a bifurcation zone based at least on the coordinates of the seed cell, the coordinates of the target cell, a distance distribution, and an angular distribution,
      d2/ determining a bifurcation cell in said bifurcation zone;
      d3/ re-iterating step d/ with a cell based on said bifurcation cell as the seed cell;
   e/ determining trajectory cells in the geological model based on the seed cell, the target cell and bifurcation cells determined in step d/;
   f/ for each current cells in the trajectory cells,
      f1/ determining conduits characteristics based on a predetermined conduit density distribution, a predetermined conduit aperture distribution and trajectory cells connected to said current cell;
      f2/ determining cell characteristics based on the conduits characteristics of said current cell;
   g/ determining a reservoir in said karstic region based on determined conduits characteristics and determined cell characteristics;
   h/ displaying a revised geological model of the subsoil with the reservoir based on the determined conduit characteristics and determined cell characteristics; and
   i/ drilling a well based on the display of the revised geological model.

2. A method according to claim 1, wherein steps b/ to f/ are re-iterated a plurality of times with same seed zone and target zone.

3. A method according to claim 1, wherein said model comprising a plurality of seed zones and a plurality of target zones, steps b/ to f/ are re-iterated a plurality of times with different combination of seed zone in the plurality of seed zones and target zone in the plurality of target zones.

4. A method according to claim 1, wherein the seed cell is determined in step b/ according a stochastic process and according a predetermined distribution in the at least one seed zone.

5. A method according to claim 1, wherein the target cell is determined in step c/ according a stochastic process and according a predetermined distribution in the at least one target zone.

6. A method according to claim 1, wherein the cell based on said bifurcation cell is said bifurcation cell.

7. A method according to claim 1, wherein the cell based on said bifurcation cell is a cell corresponding to a projection of the bifurcation cell on a line defined by the seed cell and the target cell.

8. A method according to claim 1, wherein determining trajectory cells is performed by:
   ordering the bifurcation cells according to an order of determination in step d/in a list of cells;
   adding the seed cell at a first position in said list of cells;
   adding the target cell at a last position in said list of cells;
   determining segments in the model between two consecutive cells in the list of cells; and determining cells of the model based on an approximation line algorithm.

9. A method according to claim 8, wherein the approximation line algorithm is one algorithm in a group comprising the Bresenham algorithm, the DDA algorithm, and the Run-Slice computational algorithm.

10. A method according to claim 1, wherein determining trajectory cells is performed by:
ordering the bifurcation cells according to an order of determination in step d/ in a list of cells;
adding the seed cell at a first position in said list of cells;
adding the target cell at a last position in said list of cells;
determining an interpolation curve fitting the list of cells in the model; and
determining cells of the model based on an approximation curve algorithm.

11. A method according to claim 1, wherein, determining conduits characteristics comprises:
the cell being a 2D cell, for each direction of space perpendicular to at least one edge of the current cell, if an edge of said current cell perpendicular to said direction is shared with a trajectory cell connected to said current cell, determining at least one conduit in said current cell in said direction, a radius $r_c$ of said conduit is determined in said predetermined conduit aperture distribution, or
the cell being a 3D cell, for each direction of space perpendicular to at least one side of the current cell, if a side of said current cell perpendicular to said direction is shared with a trajectory cell connected to said current cell, determining at least one conduit in said current cell in said direction, a radius $r_c$ of said conduit is determined in said predetermined conduit aperture distribution.

12. A method according to claim 11, wherein determining cell characteristics comprises:
receiving initial porosity characteristic $\phi_m$ of the current cell;
setting the equivalent porosity $\phi_{eq}$ to $\phi_m$;
for at least one current conduit in the current cell in said direction,
computing a porosity $\phi_{temp}$ of the current cell based on $$\phi_{eq}\left(1 - \frac{S_c}{S}\right) + \frac{S_c}{S}$$

where $S_c$ being a section of the current conduit and S being a section of said edge or side of said current cell perpendicular to said direction and shared with a trajectory cell;
setting the equivalent porosity $\phi_{eq}$ to $\phi_{temp}$.

13. A method according to claim 12, wherein determining cell characteristics further comprises:
receiving initial permeability characteristic $K_m$ of the current cell;
setting the equivalent permeability $K_{eq}$ to $K_m$;
for at least one current conduit in the current cell in said direction,
computing the permeability $K_{temp}$ of the current cell based on $$K_{eq}\left(1 - \frac{S_c}{S}\right) + K_c \frac{S_c}{S}$$

where $S_c$ being a section of the current conduit, S being a section of said edge or side of said current cell perpendicular to said direction and shared with a trajectory cell and where $K_c$ is the permeability of the current conduit;
setting the equivalent permeability $K_{ee}$ to $K_{temp}$.

14. A method according to claim 13, wherein permeability of the current conduit is computed based on $$\frac{N_c}{S} \cdot \frac{\pi r_c^4}{8} 10^{15}.$$

15. A method according to claim 1, wherein determining conduits characteristics comprises:
the cell being a 2D cell, for each direction of space perpendicular to at least one edge of the current cell, if a edge of said current cell perpendicular to said direction is shared with a trajectory cell connected to said current cell,
determining a number $N_c$ of conduits to be determined based on said predetermined conduit density distribution;
determining $N_c$ conduits in said current cell in said direction; or
the cell being a 3D cell, for each direction of space perpendicular to at least one side of the current cell, if a side of said current cell perpendicular to said direction is shared with a trajectory cell connected to said current cell,
determining a number $N_c$ of conduits to be determined based on said predetermined conduit density distribution;
determining $N_c$ conduits in said current cell in said direction.

16. A method according to claim 15, wherein determining cell characteristics comprises:
receiving initial porosity characteristic $\phi_m$ of the current cell;
setting the equivalent porosity $\phi_{eq}$ to $\phi_m$;
for at least one current conduit in the current cell in said direction,
computing a porosity $\phi_{temp}$ of the current cell based on $$\phi_{eq}\left(1 - \frac{S_c}{S}\right) + \frac{S_c}{S}$$

where $S_c$ being a section of the current conduit and S being a section of said edge or side of said current cell perpendicular to said direction and shared with a trajectory cell;
setting the equivalent porosity $\phi_{eq}$ to $\phi_{temp}$.

17. A method according to claim 16, wherein determining cell characteristics further comprises:
receiving initial permeability characteristic $K_m$ of the current cell;
setting the equivalent permeability $K_{eq}$ to $K_m$;
for at least one current conduit in the current cell in said direction,
computing the permeability $K_{temp}$ of the current cell based on $$K_{eq}\left(1 - \frac{S_c}{S}\right) + K_c \frac{S_c}{S}$$

where $S_c$ being a section of the current conduit, S being a section of said edge or side of said current cell perpendicular to said direction and shared with a trajectory cell and where $K_c$ is the permeability of the current conduit;

setting the equivalent permeability $K_{eq}$ to $K_{temp}$.

18. A method according to claim 17, wherein permeability of the current conduit is computed based on $$\frac{N_c}{S} \cdot \frac{\pi r_c^4}{8} 10^{15}.$$

19. A non-transitory computer readable storage medium, having stored thereon a computer program comprising program instructions, the computer program being loadable into a data-processing unit and adapted to cause the data-processing unit to carry out the steps of claim 1 when the computer program is run by the data-processing device.

* * * * *